(12) United States Patent
Eickhoff et al.

(10) Patent No.: US 8,927,895 B2
(45) Date of Patent: Jan. 6, 2015

(54) METHOD AND APPARATUS FOR SENSING THE LENGTH OF A LEAD

(75) Inventors: Stephen Theodore Eickhoff, Hanover, NH (US); Peter J. Twarog, W. Lebanon, NH (US)

(73) Assignee: Hypertherm, Inc., Hanover,, NH (US)

( * ) Notice: Subject to any disclaimer, the term of this patent is extended or adjusted under 35 U.S.C. 154(b) by 1534 days.

(21) Appl. No.: 11/888,345

(22) Filed: Jul. 31, 2007

(65) Prior Publication Data
US 2009/0032502 A1 Feb. 5, 2009

(51) Int. Cl.
*B23K 10/00* (2006.01)

(52) U.S. Cl.
CPC ...................................... *B23K 10/00* (2013.01)
USPC ............. 219/121.36; 219/130.21; 219/137.71

(58) Field of Classification Search
USPC ............... 219/121.36, 121.54, 121.57, 130.4, 219/130.32, 121.48, 137 PS; 324/662, 681, 324/699
See application file for complete search history.

(56) References Cited

U.S. PATENT DOCUMENTS

| | | |
|---|---|---|
| 4,017,707 A | 4/1977 | Brown et al. |
| 4,585,921 A | 4/1986 | Wilkins et al. |
| 4,791,268 A | 12/1988 | Sanders et al. |
| 4,821,202 A | 4/1989 | Davis et al. |
| 4,902,871 A | 2/1990 | Sanders et al. |
| 4,912,296 A | 3/1990 | Schlienger |
| 4,916,599 A | 4/1990 | Traxler et al. |
| 4,929,811 A | 5/1990 | Blankenship |
| 5,070,227 A | 12/1991 | Luo et al. |
| 5,149,940 A | 9/1992 | Davis et al. |
| 5,166,494 A | 11/1992 | Luo et al. |
| 5,357,076 A * | 10/1994 | Blankenship ............. 219/121.54 |
| 5,442,153 A | 8/1995 | Marantz et al. |
| 5,831,237 A | 11/1998 | Daniel |
| 5,866,872 A | 2/1999 | Lu et al. |
| 5,897,795 A | 4/1999 | Lu et al. |
| 6,248,975 B1 * | 6/2001 | Lanouette et al. ........ 219/130.21 |
| 6,573,733 B2 * | 6/2003 | Bohley ........................... 324/658 |
| 2002/0190710 A1 * | 12/2002 | Steinich et al. ........... 324/207.24 |

* cited by examiner

*Primary Examiner* — Brian Jennison
(74) *Attorney, Agent, or Firm* — Proskauer Rose LLP

(57) ABSTRACT

The technology features an apparatus and a method for sensing the length of a lead that connects to a power source to a thermal processing system such as a plasma torch system. Components disposed in the thermal processing system enable the length of the lead to be sensed. In addition, the time for contact starting a thermal processing system enables determination of the length of the lead.

19 Claims, 2 Drawing Sheets

METHOD AND APPARATUS FOR SENSING THE LENGTH OF A LEAD

FIELD OF THE INVENTION

The invention generally relates to the field of lead assemblies. In particular, the invention relates to an apparatus and a method for sensing the length of a lead that connects to a power source and/or a thermal processing system such as a plasma torch system.

BACKGROUND OF THE INVENTION

A thermal processing system is connected to a power source by a lead. Any of a number of leads having a variety of lead lengths can be disposed between the power source and the thermal processing system. Leads having multiple lengths can be provided and/or employed together with a thermal processing system. For example, a variety of lengths of leads are useful in, for example, a hand held thermal processing tool used around a large industrial work site or a hand held thermal processing tool employed in a contained work area, for example, in a studio or in a welding booth. The length of a lead attached to a thermal processing system (e.g., a torch, such as a plasma arc torch) can impact thermal processing system performance. The gas pressure provided to the thermal processing system can have an impact that is variously determined by the length of the lead. For example, where the thermal processing system is a plasma arc torch, the speed, cut quality, and the life of consumable parts in the plasma arc torch are impacted by the length of the lead that connects to the plasma arc torch.

SUMMARY OF THE INVENTION

State of the art thermal processing systems do not sense the length of leads and/or respond to the impact of variable length leads and, accordingly, thermal processing system performance varies depending on the lead length. The invention features apparatus and methods for sensing the length of a lead that connects to a thermal processing system. By sensing the length of the lead, processing conditions can be employed that are suited to the length of the lead connected to the thermal processing system. For example, the starting sequence and the gas pressure supplied to a thermal processing tool can be tailored to achieve a desired tool performance. In an embodiment where the thermal processing tool is a plasma arc torch, knowledge of the length of the lead enables the torch cut quality and the cut speed to be optimized. Torch starting and shutdown parameters can also be optimized when the lead length is known. In addition, operating the tool under optimum conditions extends the life of consumable parts within the tool.

In one aspect, the invention features a lead assembly connected to a power source. The lead assembly includes a lead set having a lead length. A wire is disposed within the lead set. The wire provides a current from the power source into, for example, the lead set. A component is disposed relative to the lead set, for example, the component can be disposed in the lead set. The component can have a property that is a function of the lead length, for example, an electrical property related to the lead length. The property of the electrical component is the electrical component resistance. In one embodiment, the component contacts the wire that provides current from the power source to the lead set. Optionally, the component is a second wire. In another embodiment, the component is at least one of a resistor, a capacitor or an inductor. The component can be a tube disposed in the lead through which a fluids (e.g., a gas) is transported. In one embodiment, the component is a tube volume, a tube volume per unit length, or a tube volume per cross sectional area of the tube.

The lead assembly can further include a sensor for sensing a voltage across the component. The component is disposed within the lead set, for example, at a first end of the lead set. In one embodiment, the electrical property varies (e.g., linearly) with the lead length. For example, the electrical property of the component can be proportional to the lead length. In one embodiment, the length of the lead is labeled by the electrical property of the component. In one embodiment, the component has a length, the electrical property varies (e.g., linearly) with the length of the component and the component is disposed along the length of the lead. The power source can be within a thermal processing system, for example, within a plasma torch system.

In another aspect, the invention features a plasma arc torch system in which a plasma arc torch is connected to a power source by a lead set. The lead set has a lead length. A first end of the lead set is connected to the power source and a second end of the lead set is connected to the plasma arc torch. A wire is disposed within the lead set. The wire provides an operating current from the power source to the plasma torch via the lead set. A component is disposed relative to the lead set and the component has an electrical property related to the lead length. In one embodiment, the component contacts the wire disposed within the lead set.

In another aspect, the invention features a method of sensing the length of a lead connected to a power source. The method includes providing a lead set having a lead length and providing an operating current from the power source via a wire disposed within the lead set. The method also includes determining the lead length based upon a property of an electrical component disposed relative to the lead set.

The property of the electrical component can be, for example, the electrical component resistance. The property can also be a voltage measured across the electrical component divided by a component current supplied to the electrical component. The property of the electrical component can also be a voltage supplied to the electrical component divided by a component current measured across the electrical component.

The method can also include setting a control parameter as a function of the determined lead length. The control parameter can include gas pressure, gas delivery, gas type, gas concentration, current flow, voltage limit(s), duty cycle, timing, or any combination of these.

In yet another aspect, the invention features a method of sensing the length of a lead used in a plasma arc torch assembly. The method includes actuating a gas valve disposed relative to the lead when the lead is connected to a plasma arc torch. The method includes measuring a time period for contact starting the plasma arc torch and determining the lead length as a function of the measured time period.

In the method of sensing the step of measuring a time period can include determining an increase in a duty cycle. The time period can correspond to a change in a duty cycle. The method of sensing can further include providing an inverter having a drive pulse disposed within a power source. The step of measuring a time period can include measuring the time between actuating the gas valve and when the inverter drive pulse is continuously wider than a predetermined quantity. The predetermined quantity can vary depending on the lead set, for example. In one embodiment, the predetermined quantity is a time greater than three microseconds, for example.

In one embodiment, the step of measuring a time period measures the time between actuating the gas valve and displacement of an electrode relative to a nozzle within a plasma chamber of the plasma arc torch. In another embodiment, the measured time period is the time between actuating the gas valve and displacement of a nozzle relative to an electrode within a plasma chamber of the plasma arc torch. In still another embodiment, the measured time period is the time between actuating the gas valve and movement of an element relative to a nozzle and an electrode within a plasma chamber of the plasma arc torch.

In still another aspect, the invention features a method of sensing the length of a lead used in a plasma arc torch assembly. The method includes a means for measuring a time period for contact starting the plasma arc torch and a means for determining the lead length as a function of the measured time period. Optionally, the method includes actuating a gas valve disposed relative to the lead when the lead is connected to a plasma arc torch. In one embodiment, a plasma arc torch operating parameters are adjusted based upon the determined lead length.

In another aspect, the invention features a lead set measurement system that features a power source and a lead set. The lead set has a length and the first end of the lead set is coupled to the power source. A sensing apparatus associated with the power source is configured to determine the length of the lead set based upon at least one property of a component of the lead set. The at least one property is a function of the length of the lead set. The property can be, for example, resistance of a wire disposed in the lead set or a volume of a hose disposed in the lead set. The property can vary linearly with the component length and the component can be disposed along the length of the lead. In one embodiment the property is an electrical property that varies linearly with the length of the lead. In one embodiment, the power source is within a plasma torch system. A plasma arc torch may be connected to a second end of the lead set.

In another aspect, the invention features a lead set assembly. The lead set assembly has a lead set having a length and a sensing apparatus configured to determine the length of the lead set. The sensing apparatus determines the lead set length based upon at least one property of a component of the lead set. The at least one property is a function of the length of the lead set. The property can be, for example, a resistance of a wire disposed in the lead set or a volume of a hose disposed in the lead set.

In another aspect, the invention features a power system that includes a power source and a sensing apparatus associated with the power source. The sensing apparatus is configured to determine the length of a lead set coupled to the power source based upon at least one property of a component. The at least one property is a function of the length of the lead. In one embodiment, the at least one property varies linearly with the component length and the component is disposed along the length of a lead. In another embodiment, the at least one property is an electrical property that varies linearly with the length of a lead.

In another embodiment, the invention features a method for determining a length of a lead set in a thermal processing system. The method includes providing a lead set having a length, coupling the lead set to a power source, and determining the length of the lead set based upon at least one property of a component of the lead set. The at least one property is a function of the length of the lead. The method can also include providing an operating current from the power source to lead set and determining the length based upon an electrical property of the component. In another embodiment, the method also includes setting a control parameter as a function of the determined length of the lead. The control parameter can include at least one of: gas pressure, gas delivery, gas type, gas concentration, current flow, voltage limits, duty cycle, and timing.

In another aspect, the invention features an assembly including a lead set having a lead length, a wire disposed within the lead set, and a resistive element distributed along at least a portion of the lead length. The wire provides a current from a power source and the resistance of the resistive element relates to the lead length. The resistive element can have a constant resistance along the lead length, has an electrical property that varies substantially linearly with the lead length, or includes a plurality of discrete resistive elements. In one embodiment, the assembly further includes a power source and a plasma arc torch, a first end of the lead set is coupled to the power source and a second end of the lead set is coupled to the plasma arc torch.

In another aspect, the invention features a lead set system including a power source, a lead set having a length, and a sensing apparatus associated with the power source, a first end of the lead set is coupled to the power source. The sensing apparatus associated with the power source is configured to receive a first signal and a second signal. The length of the lead set is determined based upon the time period between the first signal and the second signal. The system can also include a tube for transporting a gas through the lead set and the time period can be determined as a function of the tube volume. In one embodiment, one of the first signal and the second signal corresponds to actuating a gas valve disposed relative to the lead set. In another embodiment, one of the first signal and the second signal corresponds to a change in a duty cycle. The power source can be within a plasma torch system and the second end of the lead set can be connected to a plasma arc torch.

In another aspect, the invention features a system for adjusting a control parameter in a thermal processing system. The system can include a lead set having a length and a power source coupled to the lead set. The length is determined based upon at least one property of a component of the lead set and the property is a function of the length of the lead set. The power source has at least one control parameter for controlling operation of a thermal processing system. The power source sets the at least one control parameter based upon the determined length of the lead set. The at least one control parameter can be selected from the group of: gas pressure, gas delivery, gas type, gas concentration, current flow, voltage limits, duty cycle, and timing.

BRIEF DESCRIPTION OF THE DRAWINGS

The foregoing and other objects, feature and advantages of the invention, as well as the invention itself, will be more fully understood from the following illustrative description, when read together with the accompanying drawings which are not necessarily to scale.

DETAILED DESCRIPTION

Apparatus and methods for sensing the length of a lead that connects a power source to a thermal processing system have been developed. Methods and apparatus for sensing the length of a lead enables the user and/or the system to employ processing conditions tailored to a desired thermal processing system performance.

Figure 1:
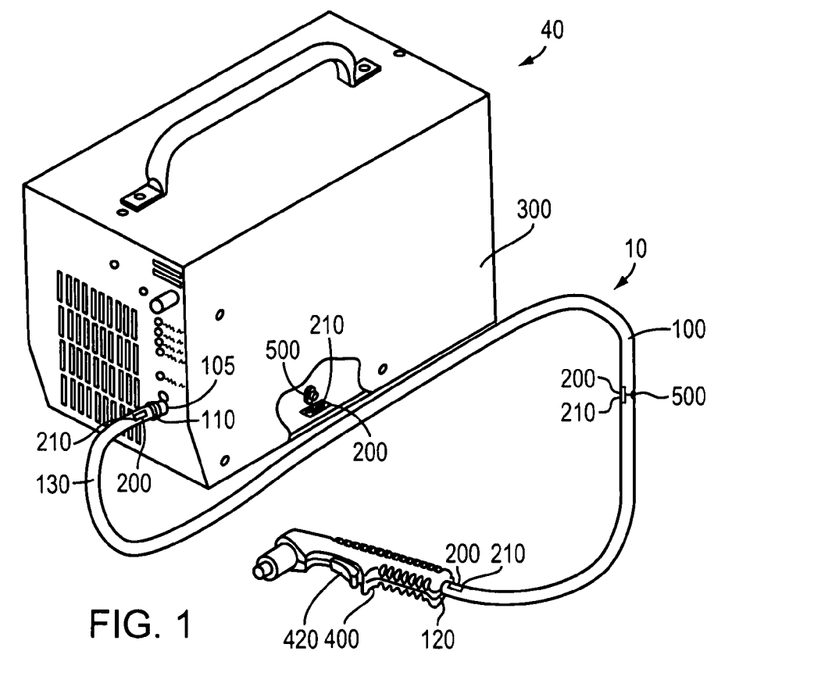
FIG. 1 is a diagram of a plasma arc torch power supply, a lead set, a plurality of discrete components, and a torch body used for cutting or piercing a metal workpiece.

In one embodiment, referring to FIG. 1, a lead assembly 10 is connected to a power source 300. The lead assembly 10 can include a lead set 100 having a lead length. Current and/or gases flow through the lead set 100. The lead set can include one or more gas tubes through which gas(es) flow. A wire 130 disposed within the lead set 100 provides a current from the power source 300 through the lead set 100. A component 200 is disposed relative to the lead set 100. The component 200 has an electrical property related to the lead length. The component 200 can be at least one of a second wire, a resistor, a capacitor or an inductor. Where the component 200 is a resistor the electrical property related to the lead length is measured in ohms. Where the component 200 is a capacitor the electrical property related to the lead length is measured in farads. Where the component 200 is an inductor, the electrical property related to the lead length is measured in henries. In another embodiment, the component 200 is a digital chip that identifies, for example, the lead length. Where the component 200 is a digital chip it can also provide other information including, for example, flow paths contained by the lead set, the amperage range suited to the lead set, the connections that the lead set is suited to connect to, for example.

The component 200 can be disposed within the lead set 100, for example, at a first end 110 of the lead set 100. In one embodiment, the component 200 is disposed in the power source 300. In another embodiment, the component 200 is disposed within the lead set 100 at a first end 110 that connects to the power source 300. Alternatively, the component 200 is disposed within the lead set 100 at the second end 120 of the lead set 100, which connects to a tool, for example a plasma arc torch 400. In one embodiment, the component 200 is disposed in the handle of the plasma arc torch 400.

The electrical property of the component 200 can, for example, vary linearly or non-linearly (e.g., according to a known function) with the lead length. Alternatively, or in addition, the electrical property of the component 200 is proportional to the lead length. In one embodiment, the lead length is labeled by the electrical property of the component 200. For example, the lead set 100 has a length measuring five feet and the electrical property of the component 200, for example a discreet component 210 disposed in a position within the lead set 100, can measure about five units, where the units can be, for example, ohms where the component 210 is a resistor, farads where the component 210 is a capacitor, henries where the component 210 is an inductor, or other type of unit depending on the selected component 210. Alternatively, the component 210 disposed in the lead set 100 measuring five feet has an electrical property that has a measure proportional to about five units, for example, about one fifth of a unit. The electrical property of the component 200 signals the length of the lead set 100 to, for example, the system or the user.

Where the component 200 is a discrete component 210, e.g., a resistor, that is disposed within the lead set 100, it is possible to incorrectly label the lead length by disposing the incorrect discreet component 210 in a lead set 100. Care should be exercised to avoid incorrectly labeling the lead set 100 with a discreet component 210 having the wrong electrical property value for the length of the lead set 100. In systems including multiple lead sets each having different lead lengths, incorrect labeling of lead sets 100 is possible, because components 200 that have different electrical properties can look identical. To avoid such mislabeling, the components 100 can optionally be labeled by, for example, associating a certain marking of the component 200 with, for example, a number corresponding to the electrical property, a number corresponding to the lead length, a color corresponding to the electrical property, and/or a color corresponding to the lead length. In addition, components 200 can have a tolerance range of from, for example, about plus or minus 0% to about plus or minus 5%. The lead length differences that can be sensed by components 200 can be limited by, for example, the tolerance capacity of the components 200. For example, a 5% difference in lead length between two different lead sets 100 may not be sensed by a component 200 that has a plus or minus 10% tolerance capacity.

Figure 2:
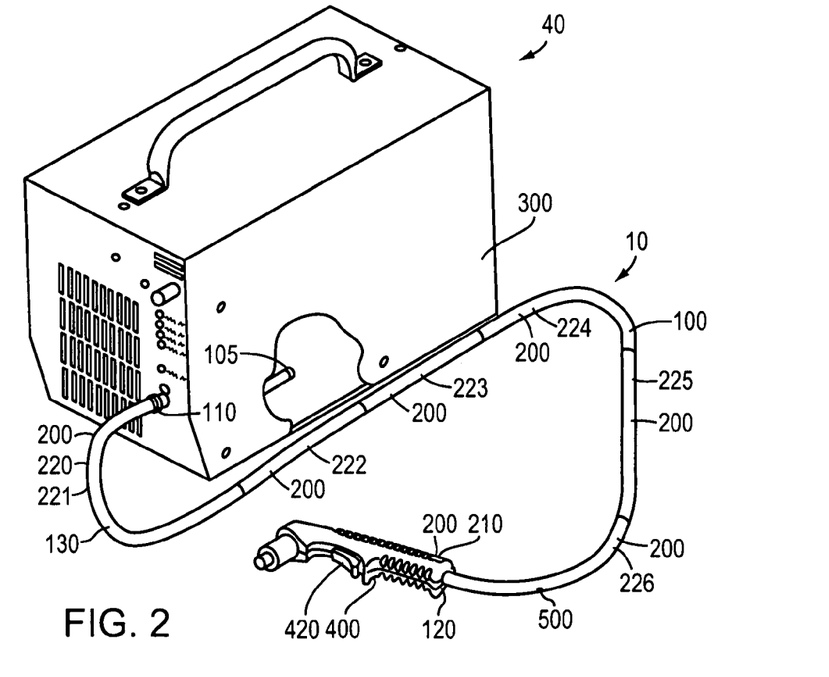
FIG. 2 is a diagram of a plasma arc torch power supply, a lead set, a component having a length, and a torch body used for cutting or piercing a metal workpiece.

In another embodiment, referring now to FIG. 2, the component 200 is a component having a length 220 and the electrical property of the component having a length 220 varies linearly with the component 200 length. The component having a length 220 is disposed along the length of the lead set 100. For example, a lead set 100 measuring 25 feet has a component having a length 220 disposed along the length of the lead set 100 the component 220 has an electrical property measuring 25 units. Likewise, where a lead set 100 measures 60 feet its component 220 is disposed along the length of the lead set 100 and the component 220 has an electrical property measuring 60 units. Advantages of using a component 220 having a length include, for example, the simplicity of construction and quality control. In one embodiment, the component having a length 220 travels along the length of the lead set 100. Referring still to FIG. 2, for convenience, each foot of a component having a length 200 is individually labeled (e.g., 221, 222, 223, 224, 225, and 226) and the component 220 measured six feet in length. If the lead set 100 were shortened from six feet to measure two feet (e.g., only individually labeled portions 225 and 226 remain in the lead set 100) the electrical property of the component 220 disposed along the length of the lead would likewise be reduced to measure two units. In an embodiment where the component is a resistor having a length 220 the total resistance of the wire would vary, for example, linearly with the lead length of the lead set 100. Components having a length 220 that are disposed along the entire length of the lead set 100 and vary linearly or proportionately along the lead length of the lead set 100 avoid incorrect labeling that can occur, for example, with discrete components 210 (see also FIG. 1).

In one embodiment, the component is a length of highly resistive wire, for example, a Nichrome wire, a Kanthal wire, a Manganin wire, or other suitable wire alloys. The gauge of the wire measured, for example, in American Wire Gauge (AWG) or Birmingham Wire Gauge (BWG) will be selected according to the application, the lead type, lead length, and the power level of the system, for example. In embodiments where the wire is a resistor, the resistance of the wire will be selected to suit, for example, the range of lead lengths that might be employed within the system. Suitable components that have a length 220 include, for example, 60 Stranded Nichrome wire in the 20 AWG size, which has a resistance of 0.67 ohm/ft. Suitable resistive wire materials can be selected, for example, to achieve a desired noise sensitivity (e.g., to provide less sensitivity to noise), dissipation, robustness, cost, and/or any combination thereof. The dissipation of the component 200 disposed relative to the lead set 100 is determined by, for example, the resistance of the component 200 and the current provided to the component 200 via the lead set 100. For example, the current is provided to the component 200 via the wire 130 disposed in the lead set 100. Specifically, the dissipation is power which is measured in watts (watts=volts$^2$/ohms) and is determined by, for example, multiplying the current provided to the component 200 measured in volts is raised by the power of two and then dividing that sum by the resistance of the component 200 measured in ohms. The current provided and the resistance of the component 200 can be selected to achieve a desired level of dissipation in the lead set 100. In one embodiment, the current supplied to the component and the resistance of the component are selected to provide power having a value within a range of, for example, from about 0 watts to about 80 watts, from about 20 watts to about 60 watts, or about 40 watts. In embodiments where the component 200 is a component having a length 220 that is disposed along the length of the lead set 100, the dissipation of the component 200 can be measured in, for example, watts per foot. The dissipation of the component having a length 220 can be selected to provide heating and/or power having a value within a range of, for example, from about 0 watts/foot to about 100 watts/foot, from about 10 watts/foot to about 80 watts/foot, from about 20 watts/foot to about 60 watts/foot, or about 40 watts/foot.

Referring to FIGS. 1 and 2, the power source 300 to which the lead assembly 10 is connected can be, for example, within a thermal processing system. In one embodiment, the power source 300 is within a plasma torch system. The power source 300 provides a current to a wire 130 disposed in the lead set 100. The first end 110 of the lead set 100 is connected to the power source 300 and the second end 120 of the lead set 100 is disposed on the plasma arc torch 400.

In one embodiment, the power source 300 is a current source that provides a steady amperage through the wire disposed 130 in the lead set 100. The steady amperage can be provided for only a discrete amount of time, for example. Alternatively or in addition, the power source 300 is a current source that provides a steady amperage through a component 200, for example, a component having a length 220 that is disposed along the lead length of the lead set 100. In one embodiment, the power source 300 provides a steady amperage through a wire 130 and the wire 130 is in contact with a component 200 that has an electrical property related to the lead length. The component 200 can be, for example, a discreet component 210. The power source 300 amperage can be a relatively low amperage having a value measuring, for example, from about 5 mA to about 500 mA, from about 10 mA to about 100 mA, or about 50 mA. For example, in one embodiment a current source starts up at a current of about 50 mA and 50 mA of current is sent through the wire 130 and/or through the component 200.

In another embodiment, a voltage source with a fixed resistance is employed to provide a current. Suitable voltage sources can include, for example, a separate, low voltage, power supply.

The component 200, for example, a second wire (e.g., a copper sense wire), a resistor, a capacitor, or an inductor disposed relative to the lead set 100 can sense the voltage that corresponds to the lead length of the lead set 100. The voltage that corresponds to the lead length can be sensed at, for example, the power source 300. A discreet component 210 can be disposed at one or more of the first end 110 or the second end 120 of the lead set 100.

Referring still to FIGS. 1 and 2, the lead assembly 10 can also include a sensor 500 for sensing a voltage across the component 200. Suitable sensors can include, for example, a voltmeter or an electrical shunt.

A plasma arc torch system 40 can include a plasma arc torch 400 connected to a power source 300 by a lead set 100. The lead set 100 has a lead length. A first end 110 of the lead set 100 is connected to the power source 300. A second end 120 of the lead set 100 is connected to the plasma arc torch 400. A first wire 130 is disposed within the lead set 100. The first wire 130 provides an operating current from the power source 300 to the plasma arc torch 400. A component 200 is disposed relative to the lead set 100. The component 200 has an electrical property related to the lead length of the lead set 100.

The invention also features a method of sensing the length of a lead connected to a power source 300. The method includes providing a lead set 100 having a lead length. An operating current is provided from the power source 300 via a wire 130 disposed within the lead set 100. The lead length of the lead set 100 is determined based upon a property of an electrical component 200 disposed relative to the lead set 100.

In an embodiment where the component 200 is a resistor, the property of the electrical component is the electrical component resistance. Sensing and/or measuring the electrical component resistance enables determination of the lead length of the lead set 100. For example, where the resistance labels the lead length the value of the resistance can indicate the length of the lead set (e.g., a sensed resistance value of 50 ohms indicates a lead set with a lead length of 50 feet connects the plasma arc torch 400 to the power source 300 in the plasma arc torch system 40).

In another embodiment, the property of the electrical component 200 is a voltage measured across the electrical component 200 divided by a component current supplied to the electrical component 200. The voltage is measured across the electrical component by, for example, a sensor 500. A known electric current can be run through the electrical component 200 and the sensor 500 can measure, for example, a drop in the voltage across the electrical component 200 to thereby determine the value of the resistance across the component.

In another embodiment, the property of the electrical component 200 is a known voltage supplied to the electrical component 200 divided by a component current measured across the electrical component 200 by, for example, a sensor 500.

In another embodiment, once the lead length of the lead set 100 is sensed and/or determined by any suitable means, a control parameter is set. The selected control parameter setting is a function of the determined lead length. The control parameter can be, for example, gas pressure, gas delivery, gas type, gas concentration, current flow, voltage limit(s), duty cycle, timing, or any combination of these. For example, the starting sequence and/or the gas pressure supplied to a plasma arc torch 400 are controlled thereby enabling optimum torch cut quality, cut speed, and extension of the life of consumable parts used by the plasma arc torch 400.

In one embodiment, the control circuitry that serves a portion of the tool that a user interacts with, for example the trigger 420 or a start button 470 (see, e.g., FIG. 3) on the plasma arc torch 400, is maintained separate from the remaining portions of the circuitry that provide the operating current to the component 200 and/or provide plasma energy to the plasma arc torch 400. In one embodiment, opto-isolators are employed to route signal and to draw power from separate transformer windings to isolate the control circuitry.

In an embodiment where the sensor 500 for sensing voltage across the component 200 is placed on the control board then a linear isolator can be employed to carry the analog voltage signal from the torch to the control board. The control board can be disposed in, for example, the power source 300. The analog voltage signal of the torch can be converted to a digital signal to enable use of a digital signal opto-isolator, but such a conversion can take place, for example, on the low voltage control board. In another embodiment, the analog voltage signal from the torch is converted to a parallel digital packet by an analog to digital converter and is thereafter routed through digital opto-isolators. In still another embodiment, the analog voltage signal of the torch is converted to a parallel digital packet and is thereafter routed through a serial string for conversion by a digital opto-isolator. In yet another embodiment, the isolation of the torch and the control board is eliminated, which allows sensing of the voltage across the component 200 by the sensor 500 without any intermediary devices.

Figure 3:
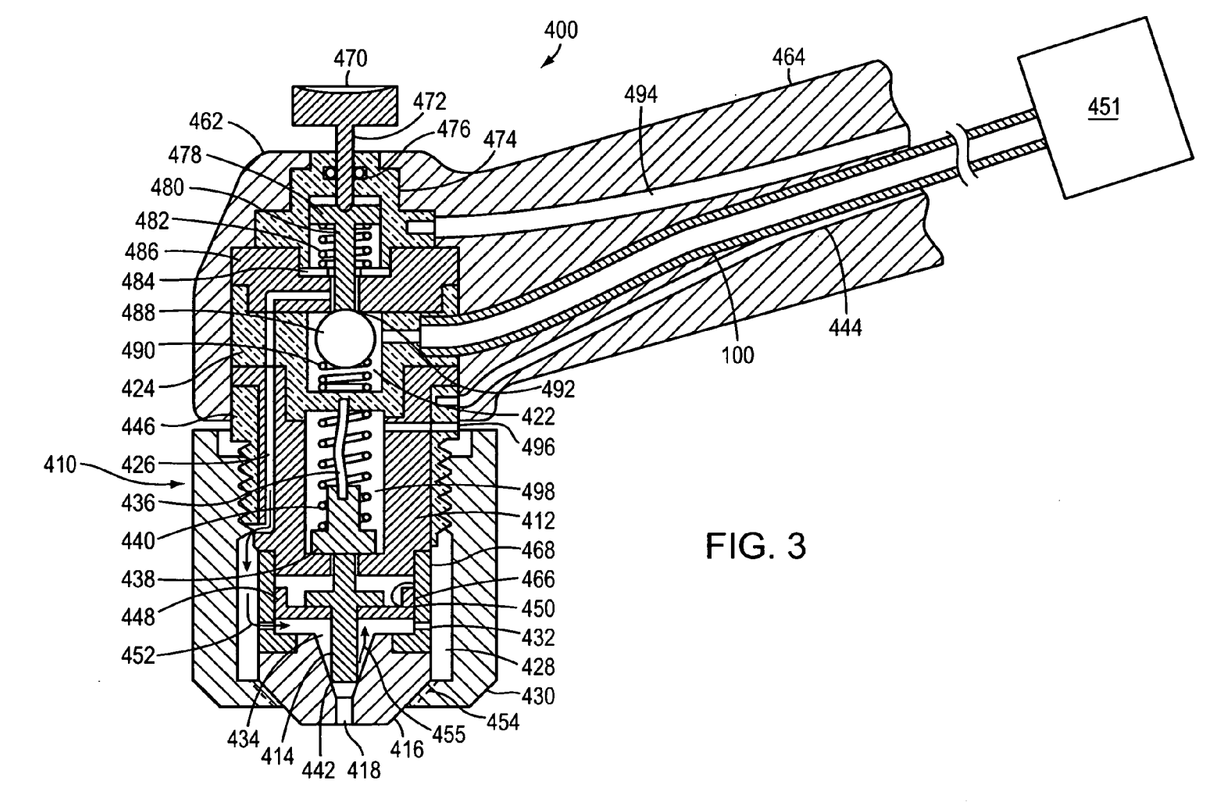
FIG. 3 is a view in vertical section of a plasma arc torch using a contact starting system.

The lead length can also be detected by measuring one or more time periods associated with operating a thermal processing system such as, for example, a plasma arc torch system. The thermal processing system can be a plasma arc torch system that uses contact starting, for example, a hand-held plasma torch. Referring now to FIGS. 1-3, a lead set 100 connects a power source 300 to a hand-held plasma torch 400. The hand-held plasma torch 400 has a torch body 410 with a generally cylindrical lower torch body 412 located by a gap current ring 446 below a torch head 462. The lower torch body 412 corresponds to the lower portion of the torch body 410 in torch 400, while the torch head 462 together with a torch handle 464 correspond generally to the upper portion of the torch body 410. The torch 400 can be hand-held for example and includes a moveable electrode 414, having a stationary piston part 448 which slidingly engages the electrode 414 within a cylinder 450.

The piston part 448 is separate from the electrode 414 and can be fabricated from an insulating material, for example. Furthermore, piston part 448 includes a piston skirt 466 which provides a relatively large piston to cylinder-wall contact area, guiding the electrode 414 and preventing it from becoming skewed within the cylinder 450. Additionally, the cylinder 450 is formed within a swirl ring 468 rather than at the lower torch body 412 at the lower end of the torch body 410. The swirl ring 468 includes the gas swirl holes 432, leading tangentially from the annular space 428 into the plasma chamber 434. The swirl ring 468 may also be fabricated from an insulating material.

In one embodiment, both electrical current flow and ionizable gas flow are initiated, in the proper sequence, by depressing a single start button 470 disposed relative to the torch 400.

The start button 470 includes a button stem 472 that passes through a contact plunger body 474 and an O-ring 476, and finally engages a contact plunger 478. The contact plunger 478 has a plunger stem 480 which passes through a plunger return spring 482, a washer 484, and an insulator 486. The hole in the insulator 486 through which the plunger stem 480 passes has a diameter which is somewhat larger than the diameter of the plunger stem 480. There is an annular space between the plunger stem 480 and the insulator 486.

A plenum 422 is formed within a connector block 424 and is located immediately below the insulator 486. Within the plenum 422 is a gas inlet check ball 488 and a ball return spring 490. The ball return spring 490 urges the check ball 488 upward within the plenum 422 to rest against a seat area 492, blocking the hole at the bottom of the insulator 486.

The torch 400 is started by depressing the start button 470. This causes the button stem 472 to exert a downward force on the contact plunger 478, acting against the force of the return spring 482. The contact plunger 478, is at all times in electrical connection with a start button wire 494, through a circuit including the contact plunger body 474, the washer 484, and the return spring 482. In a similar manner, the gas inlet check ball 488 is at all times in electrical connection with the lead set 100, through a circuit including the connector block 424 and the ball return spring 490. The start button wire 494 connects the contact plunger body 474 to a starting current source such as, for example, the power source 300. Current and/or gases flow through the lead set 100 to the plasma arc torch 400.

When the start button 470 is depressed sufficiently so that the plunger stem 480 contacts the check ball 488, a circuit from the start button wire 494 to the lead set 100 is closed. The closing of this plunger to check ball starting circuit is sensed in the remote power source 300, turning on the power source and causing current on the order of from about 5 mA to about 50 A to flow through the lead set 100, the connector block 424, the plunger wire 436, the plunger 438, and into the electrode 414. At this point during the starting procedure, the electrode 414 is forced against the contact area 442 of the nozzle 416. Thus, current flows in the dead short mode of operation from the electrode 414 through the nozzle 416, into the cap 430, current ring 446, and pilot arc return lead 444.

By continuing to depress the start button 470 further, the check ball 488 is displaced downward from its normally seated position against seat area 492. This allows gas, under pressure from a remote gas source 451, connected to the main current and lead set 100, to flow from the plenum 422 past the check ball 488, into the annular gap between the plunger stem 480 and the insulator 486, and through a passage 426 in the insulator 486, the connector block 424, and the lower torch body 412. The gas generally follows arrows 452, flowing into the annular space 428, through the swirl holes 432, and fills the plasma chamber 434. In an alternate embodiment, some of the gas flow may be bypassed to cool the nozzle 416 through cooling holes 454, shown in phantom in FIG. 3.

Gas pressure exerts a force on the underside of the piston part 448, overcoming the force exerted by the electrode spring 440 and driving the electrode 414 upward within the cylinder 450, in direction 455, thereby opening the orifice 418, and breaking electrical contact at area 442. Thus, a pilot arc is generated between the electrode 414, serving as the cathode, and the nozzle 416, which serves as the anode. Gas flowing around the arc and through the nozzle orifice 418 forms a plasma jet, and the hand-held torch 400 may be operated in this nontransferred pilot arc mode. When the electrode 414 is driven in direction 455 upward within the cylinder 450 (referred to as "blow back") the plasma arc torch 400 is contact started, because the electrical contact at area 442 is exposed, enabling the pilot arc to be generated between the electrode 414 and the nozzle 416.

The torch 400 may be converted to the transferred mode by bringing the torch 400, while operating in the pilot arc mode, near a workpiece held at anode potential, transferring the arc from the nozzle 416 to the workpiece. Once the arc is transferred, the pilot arc lead 444 could be interrupted, stopping current flow in the pilot arc circuit. The hand-held torch 400 will operate in either the pilot arc or transferred mode only as long as the start button 470 remains depressed.

In one embodiment, to ensure rapid movement of the electrode 414, a trapped gas bleed hole 496 allows any gas which flows past the plunger 438 and into a spring plenum 498 to bleed out of the plenum 498, preventing the gas from resisting the force exerted on the underside of piston part 448.

In one embodiment, a method of sensing the length of a lead 100 used in a plasma arc torch assembly 40 includes actuating a gas valve 105 disposed relative to a lead 100 connected to a plasma arc torch 400. The length of the lead 100 is determined as a function of the time period for contact starting the plasma arc torch. In accordance with the method, the time period for contact starting the plasma arc torch is measured.

The lead 100 can be disposed, for example, between the plasma arc torch 400 and the power source 300. In one embodiment, the time period is the time between actuating the gas valve 105 and displacement of an electrode 414 (e.g., movement of the electrode 414 in direction 455) relative to a nozzle 416 within a plasma chamber 434 of the plasma arc torch 400. In another embodiment, the time period is the time between actuating the gas valve 105 and displacement of a nozzle 416 relative to an electrode 414 within a plasma chamber 434 of the plasma arc torch 400. In still another embodiment, the time period is the time between actuating the gas valve 105 and movement of an element relative to a nozzle 416 and an electrode 414 within a plasma chamber 434 of the plasma arc torch 400. A component is disposed in and/or relative to the lead 100. The component has at least one property that is a function of the length of the lead 100. The component can be a tube volume, a tube volume per unit length, a tube volume per cross sectional area of the tube, or a gas speed (e.g., measured in feet per milliseconds).

In one embodiment, the method also includes providing an inverter having a drive pulse disposed within a power source 300. Suitable inverters include, for example, Emitter Switched Bipolar Transistors (ESBT's), metal-oxide-semiconductor field-effect transistor (MOSFET's), and Insulated Gate Bipolar Transistor (IGBT's).

In one embodiment, measuring a time period includes measuring the time between actuating the gas valve 105 and when the inverter drive pulse is continuously wider than a predetermined quantity. When the electrode 414 is driven in direction 455 upward within the cylinder 450 and the plasma arc torch 400 is contact started, the electrode 414 and the nozzle 416 are physically separated. When operating the inverter at a fixed frequency and in a constant current supply mode, the power required for the current to cross the gap between the electrode 414 and the nozzle 416 thereby generating the pilot arc requires an increase in the duty cycle of the power source 300. This increase in the duty cycle generated in, for example, the power source 300 is revealed, for example, by the inverter drive pulse becoming longer (and consequently wider) than a predetermined quantity. The time period between actuating the gas valve 105 and when the inverter drive pulse is continuously wider than a predetermined quantity can be employed to determine the length of the lead, since the increase in inverter drive pulse width is indicative of, for example, electrode 414 displacement.

The predetermined quantity of the inverter drive pulse will vary by the thermal processing system application. For example, the inverter drive pulse width will decrease when a power source frequency is increased. For example, for a given application e.g., plasma arc torch assembly, the frequency is at a fixed level, for example, 20 kHz. If the frequency of the plasma arc torch assembly power source were increased to, for example, 40 kHz then as a result the inverter drive predetermined pulse width is decreased as compared to the predetermined pulse width where the frequency was at the 20 kHz level. In one embodiment, the predetermined quantity is, for example, a time period greater than about 1 microsecond. The time period can be a value within the range of from about 1 microsecond to about 40 microseconds, from about 3 microseconds to about 20 microseconds, or about 8 microseconds. In one embodiment, the predetermined quantity is a time period greater than about 3 microseconds, which indicates a plasma arc voltage that is greater than 30 volts was started.

The length of the lead 100 can be determined as a function of the measured time period for contact starting the plasma arc torch. The relationship between the measured time period and the length of the lead is expressed as equations 1 and 2:

$$T=(L/a)+b+c \quad \text{(equation 1)}$$

$$L=a(T-b-c) \quad \text{(equation 2)}$$

L is the lead length (measured in, for example, feet), T is the measured time period for contact starting the plasma arc torch 400 (e.g., measured time period is between actuating the gas valve 105 and displacement of an electrode 414 relative to a nozzle 416 within a plasma chamber 434 of the plasma arc torch 400 and is measured in microseconds), a is the gas traveling speed from valve to the end of the torch (measured in feet/millisecond), b is the gas valve mechanical time delay (measured in milliseconds), and c is the consumable time factor, which is determined by measuring the separation time (measured in milliseconds) under pressure for a given torch and consumable assembly. The linear relationship between the measured time period and the lead length can be employed to sense and/or determine the length of the lead.

In addition, controls can be built directly into the plasma arc torch assembly 40 to sense and/or determine the lead length. In one embodiment, a part of the torch assembly 40 such as the power source 300 or the torch 400 employ the lead length information to diagnose problems with the torch 400 (e.g., gas regulators and plungers within the torch 400) and/or gas stream(s) that flow into the torch. Referring now to FIGS. 1-3, lead length information can be gathered by calculation according equations 1 and 2 and/or by employing one or more components 200. For example, components 200 can be used to verify the lead length determination provided by equations 1 and 2 and, likewise, the systems can employ equations 1 and 2 to verify the lead length sensed by a component 200.

The lead length information can be employed to regulate the flow of gas traveling through the lead. In one embodiment, the sensed and/or determined lead length is displayed to the user who in response to the lead length information can adjust and/or regulate inputs to the torch to obtain the desired torch performance. Alternatively, an automatic control system senses and/or determines the lead length and regulates the inputs to the torch 400 in response to the sensed and/or determined lead length. For example, the torch assembly 40 can include software that computes the length of the lead and/or controls the performance of the assembly 40 (e.g., the flow of inputs to the torch including type of gas, gas flow rates, voltage, for example) as a result of the sensed and/or determined lead length. For example, once the lead length is sensed and/or determined a control parameter can be set as a function of the lead length. For example, a desired gas pressure, gas delivery, gas type, and/or gas concentration can be set as a function of the lead length. Controlling parameters including, for example, the starting sequence and/or the gas pressure supplied to the plasma arc torch enables optimization of torch cut quality and cut speed.

In one embodiment, the methods and apparatus for sensing and/or detecting the length of a lead set first determine that a lead connected to the plasma arc torch and/or the power source and then senses and/or detects the length of the connected lead.

A common problem in plasma arc torches is substantial wear of the electrode, particularly when the electrode is used with reactive gases such as oxygen or air. Plasma arc torches show wear as a generally concave pit on the lower end of the electrode, or more precisely, on an emitting element of hafnium mounted on the electrode. When the wear produces a pit depth of 0.060 inch or more, Hypertherm, Inc. recommends that the electrode be replaced. In ordinary use, consumable parts of the plasma arc torch require replacement due to wear. For example, the electrode of a plasma arc cutting torch operating with reactive gases typically requires replacement after 0.5 to 2 hours of use depending strongly on the number of on-off cycles. Wear considerations are significant not only because they necessitate the repeated replacement of a consumable component, but also because they limit the maximum power that can be applied to a given torch. Lower wear has been associated with lower current levels, but at some point the reduction in performance associated with a reduced operating current becomes too great.

In order to improve consumable life, just prior to starting the plasma torch, a preflow is initiated at a low mass flow rate, where the flow is sufficient to initiate and sustain a pilot arc between the electrode and the nozzle, but not sufficiently high that the electrode exhibits the same wear characteristics that it would exhibit absent the start up. A preflow of 60% of the full operating flow for a duration of 4 seconds is typical. The preflow gas can be pure oxygen or some other gas such as air, argon or nitrogen. The flow pattern of the preflow can also be altered to be an axial flow or the flow pattern and mass flow rate can both be altered, in coordination with one another. For cutting mild steel the start-up process also includes changing to pure oxygen and increasing the gas flow after the pilot arc transfers to the workpiece. If a gas such as air, argon, or nitrogen is used for the preflow, this increase also includes switching over to a flow of pure oxygen as the plasma gas during normal cutting in the transferred arc mode. This increase is preferably a ramped up increase in the flow rate such that the gas flow and pressure reach their desired full operating values generally in coordination with the arc current increasing to its full operating value. Knowledge of the length of the lead set can be used to determine the rate of reduction, the type of preflow gas, and/or the preflow gas flow rate, for example.

To improve the life of consumables, the mass flow rate of the gas and/or its flow pattern immediately before and immediately after the step of cutting off of the current to the torch can be altered. The mass flow rate is reduced by reducing the gas flow achieved by either closing off or reducing the gas flow to the plasma chamber. This mass flow rate reduction is timed to occur within a few hundred milliseconds before the current cut off, and preferably continue after cut off. The process step of cutting the arc current can be accomplished by a sudden step function of time or a gradual ramp function of time. The lead length can be employed to determine the rate of reduction suited to the application, the consumables, and/or the torch, for example. Consumable life is most readily improved when both the start up steps and the cut off steps are employed.

The thermal processing system, the lead assembly, the power source, the components, the methods for sensing lead length and other aspects of what is described herein can be implemented in plasma arc torch systems, cutting systems, welding systems, spray coating systems, and other suitable systems known to those of ordinary skill in the art. Variations, modifications, and other implementations of what is described herein will occur to those of ordinary skill without departing from the spirit and the scope of the invention. Accordingly, the invention is not to be defined only by the illustrative description.

Example 1

A plasma arc torch is attached to a power source by a first lead set having a first length and including a 60 Stranded Nichrome wire in the 20 AWG size having a resistance of 0.67 ohm/ft. The plasma arc torch is then attached to a power source by a second lead set having a second length and including a 60 Stranded Nichrome wire in the 20 AWG size having a resistance of 0.67 ohm/ft.

The first lead set having a first length is provided and a 60 Stranded Nichrome wire in the 20 AWG size having a resistance of 0.67 ohm/ft is disposed along the length of the first lead set. A 50 mA current is consistently flowed from the power source through the first lead set to the plasma arc torch. The resistance of the 60 Stranded Nichrome wire in the 20 AWG size causes a voltage of 0.84 Volts. The voltage output of the lead set indicates that the lead length measures 25 feet (7.5 meters).

The second lead set having a second length is provided and a 60 Stranded Nichrome wire in the 20 AWG size having a resistance of 0.67 ohm/ft is disposed along the length of the first lead set. A 50 mA current is consistently flowed from the power source through the second lead set to the plasma arc torch. The resistance of the 60 Stranded Nichrome wire in the 20 AWG size causes a voltage of 3.35 Volts. The voltage output of the lead set indicates that the lead length measures 100 feet (30 meters).

Example 2

A plasma arc torch is attached to a power source by a lead set having a length. Both gas and current can flow through the lead set. A gas valve is disposed at the connection of the lead set to the power source operating at 42 kHz. An IGBT-based inverter is disposed within the power source. When the plasma arc torch is turned off, the electrode is forced against the contact area of the nozzle. Any current that flows through the plasma arc torch in this dead short mode travels from the electrode through the nozzle, into the cap, into the current ring, and through the pilot arc return lead.

In order to start up the plasma arc torch, a start button on the plasma arc torch is actuated. The gas valve located at the connection of the power source and the lead set opens thereby enabling gas to flow at a speed of 0.6 feet/millisecond through the lead set toward the plasma arc torch. The time $T_0$ when the gas valve is opened is noted. The pressure of the gas exerts a force that drives the electrode in a direction away from the nozzle thereby breaking the contact area and opening up an orifice through which plasma can travel. The plasma arc torch is contact started when a pilot arc is generated between the electrode, which serves as the cathode, and the nozzle, which serves as the anode. Gas flowing into the plasma arc torch and through the nozzle orifice forms a plasma jet (see, FIG. 3).

The power required for current to cross the gap between the electrode and the nozzle and to generate the pilot arc increases the duty cycle of the power source. As a result, the IGBT drive pulse widens and a second time, $T_1$, is noted when the drive pulse is wider than a predetermined quantity, e.g., wider than three microseconds.

The time period for contact starting the plasma arc torch T is the time, measured in microseconds, that elapsed between $T_0$ and $T_1$. Once the time period T is determined the determined time period T is used to determine the length of the lead set according to equation 2.

$$L=a(T-b-c) \qquad \text{(equation 2)}$$

L is the lead length (15 feet);
T is the measured time period for contact starting the plasma arc torch (35 milliseconds);
a is the gas traveling speed from valve to the end of the torch (0.6 feet/millisecond);
b is the gas valve mechanical time delay (5 milliseconds)
c is the consumable time factor, which is determined empirically (5 milliseconds).

What is claimed is:
1. A lead set measurement system for a thermal processing system comprising:

a lead set having a length extending from a first end of the lead set coupled to a thermal processing system power source to a second end connected to a plasma arc torch;

a component, comprising a tube, disposed along the length of the lead set for transporting at least one gas through the tube, the component having a tube volume that is a function of the length of the lead set; and a sensing apparatus disposed in the thermal processing system power source and configured to receive a first signal and a second signal, wherein (i) one of the first or second signal corresponds to actuating a gas valve disposed relative to the lead set and (ii) the length of the lead set is determined based upon a time period between the first signal and the second signal that is dependent on the tube volume.

2. The system of claim 1 wherein one of the first or second signal corresponds to a drive pulse of an inverter, disposed in the power source, being wider than a predetermined quantity.

3. The system of claim 1 wherein the thermal processing system power source is within a plasma torch system.

4. The system of claim 1 wherein the time period corresponds to a change in a duty cycle.

5. The system of claim 1 wherein the time period is a time between actuating the gas valve and one of (i) displacement of an electrode relative to a nozzle within a plasma chamber of the plasma arc torch; or (ii) displacement of a nozzle relative to an electrode within a plasma chamber of the plasma arc torch; or (iii) movement of an element relative to a nozzle and an electrode within a plasma chamber of the plasma arc torch.

6. A lead set of a thermal processing system comprising:
a lead set having a length extending from a first end coupled to a thermal processing system power source to a second end connected to a plasma arc torch, the lead set including at least one gas through which gas flows to the plasma arc torch;

a component, comprising a tube, disposed along the length of the lead set for transporting the at least one gas through the tube, the component having a tube volume that is a function of the length of the lead set; and a sensing apparatus disposed within the lead set and configured to receive a first signal and a second signal, wherein (i) one of the first or second signal corresponds to actuating a gas valve disposed relative to the lead set and (ii) the length of the lead set is determined based upon a time period between the first signal and the second signal that is dependent on the tube volume.

7. The lead set assembly of claim 6 wherein one of the first or second signal corresponds to an inverter drive pulse being wider than a predetermine quantity.

8. A system for adjusting a control parameter in a thermal processing system, comprising:
a lead set having a length extending from a first end to a second end connected to a plasma arc torch;

a component, comprising a tube, disposed along the length of the lead set for transporting at least one gas through the tube, the component having a tube volume that is a function of the length of the lead set; and a thermal processing system power source coupled to the first end of the lead set and configured to determine the length of the lead set based on the a time period between a first signal and a second signal that is dependent on the tube volume, the thermal processing system power source having at least one control parameter controlling operation of the thermal processing system, the at least one control parameter selected from the group of: gas pressure, gas delivery, gas type, gas concentration, current flow, voltage limits, duty cycle, and timing, wherein the thermal processing system power source sets the at least one control parameter based upon the determined length of the lead set.

9. The lead set of claim 6 wherein the sensing apparatus is disposed within the first end of the lead set.

10. The lead set of claim 6 wherein the sensing apparatus is disposed within the second end of the lead set.

11. The lead set of claim 1 wherein the lead set is composed of individual components such that the multiple individual components formed together equals the length of the lead set.

12. The system of claim 6 wherein the time period is a time between actuating the gas valve and one of (i) displacement of an electrode relative to a nozzle within a plasma chamber of the plasma arc torch; or (ii) displacement of a nozzle relative to an electrode within a plasma chamber of the plasma arc torch; or (iii) movement of an element relative to a nozzle and an electrode within a plasma chamber of the plasma arc torch.

13. The system of claim 8 wherein one of the first signal or the second signal corresponds to actuating a gas valve disposed relative to the lead set.

14. The system of claim 8 wherein one of the first or second signal corresponds to a drive pulse of an inverter, disposed in the thermal processing system power source, being wider than a predetermined quantity.

15. The system of claim 8 wherein the time period is a time between actuating a gas valve and one of (i) displacement of an electrode relative to a nozzle within a plasma chamber of the plasma arc torch; or (ii) displacement of a nozzle relative to an electrode within a plasma chamber of the plasma arc torch; or (iii) movement of an element relative to a nozzle and an electrode within a plasma chamber of the plasma arc torch.

16. A lead set measurement system for a thermal processing system comprising:
a lead set having a length extending from a first end of the lead set coupled to a thermal processing system power source to a second end connected to a plasma arc torch;

a component, comprising a tube, disposed along the length of the lead set for transporting at least one gas through the tube, the component having a tube volume that is a function of the length of the lead set; and a sensing apparatus disposed in the thermal processing system power source and configured to receive a first signal and a second signal, wherein the length of the lead set is determined based upon a time period between the first signal and the second signal that is dependent on the tube volume, the time period being a time between actuating a gas valve and one of (i) displacement of an electrode relative to a nozzle within a plasma chamber of the plasma arc torch; or (ii) displacement of a nozzle relative to an electrode within a plasma chamber of the plasma arc torch; or (iii) movement of an element relative to a nozzle and an electrode within a plasma chamber of the plasma arc torch.

17. The system of claim 16 wherein one of the first or second signal corresponds to actuating a gas valve disposed relative to the lead set.

18. The system of claim 16 wherein one of the first or second signal corresponds to an inverter drive pulse being wider than a predetermine quantity.

19. The system of claim 16 wherein the time period corresponds to a change in a duty cycle.

* * * * *